United States Patent
Hamlin et al.

(10) Patent No.: US 9,858,807 B2
(45) Date of Patent: Jan. 2, 2018

(54) WIRELESS CONTROL SYSTEM FOR VEHICLE HANDLE

(71) Applicant: Gentex Corporation, Zeeland, MI (US)

(72) Inventors: Bradley R. Hamlin, Allendale, MI (US); Danny L. Minikey, Jr., Fenwick, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 15/181,743

(22) Filed: Jun. 14, 2016

(65) Prior Publication Data

US 2016/0364982 A1      Dec. 15, 2016

Related U.S. Application Data

(60) Provisional application No. 62/175,673, filed on Jun. 15, 2015.

(51) Int. Cl.
  *G05B 11/01*    (2006.01)
  *G08C 17/02*    (2006.01)

(52) U.S. Cl.
  CPC ......... *G08C 17/02* (2013.01); *G08C 2201/20* (2013.01); *G08C 2201/21* (2013.01)

(58) Field of Classification Search
  CPC ...... G07C 2009/00928; G07C 9/00182; G07C 9/00896; B62J 6/005
  USPC .............................. 340/5.71, 12.5, 426.1, 432
  See application file for complete search history.

(56) References Cited

U.S. PATENT DOCUMENTS

| 4,241,870 | A  |   | 12/1980 | Marcus |
| 6,956,952 | B1 | * | 10/2005 | Riggs ................ H04B 1/082 307/10.1 |
| 2006/0213755 | A1 | * | 9/2006 | Chang ............... H01H 9/168 200/61.54 |
| 2013/0147616 | A1 | * | 6/2013 | Lambert ............ G07C 5/008 340/426.1 |

FOREIGN PATENT DOCUMENTS

RU    2536422 C2    12/2014
WO   2010039065 A1    4/2010

OTHER PUBLICATIONS

International Search Report and Written Opinion of the International Searching Authority, or the Declaration, dated Oct. 20, 2016, for International Application No. PCT/US2016/037341, filed Jun. 14, 2016, 9 pages.

* cited by examiner

*Primary Examiner* — Kerri McNally
*Assistant Examiner* — Sharmin Akhter
(74) *Attorney, Agent, or Firm* — Price Heneveld LLP; Bradley D. Johnson

(57) ABSTRACT

A wireless control system for controlling a remotely controlled device is disclosed. The wireless control system comprises a circuit assembly. The circuit assembly comprises a transceiver circuit and an input device in communication with a control circuit. The control circuit is configured to control the transceiver circuit in response to an input received from the input device. The circuit assembly forms a profile shape configured to be significantly disposed within a handle portion of a vehicle.

17 Claims, 5 Drawing Sheets

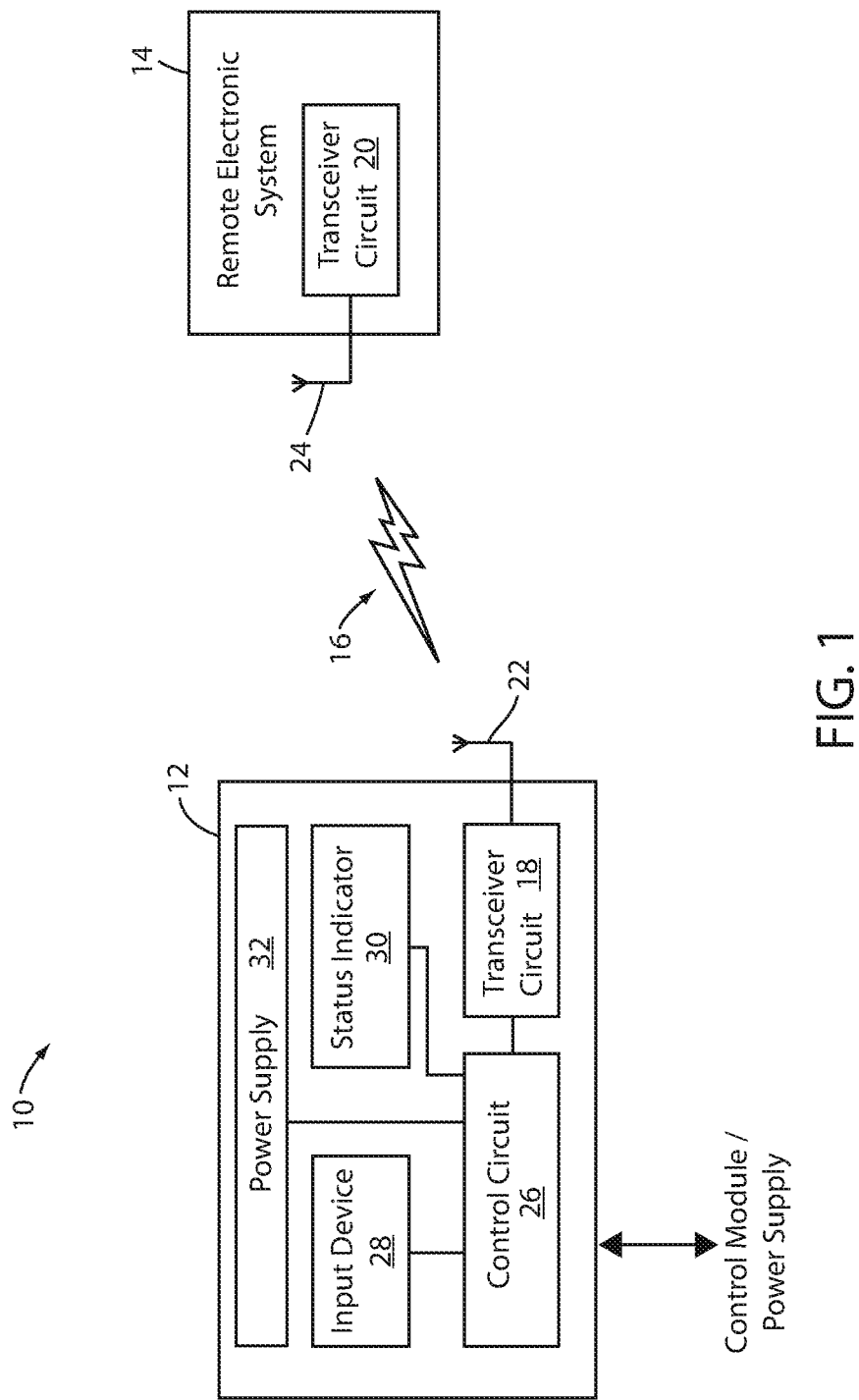

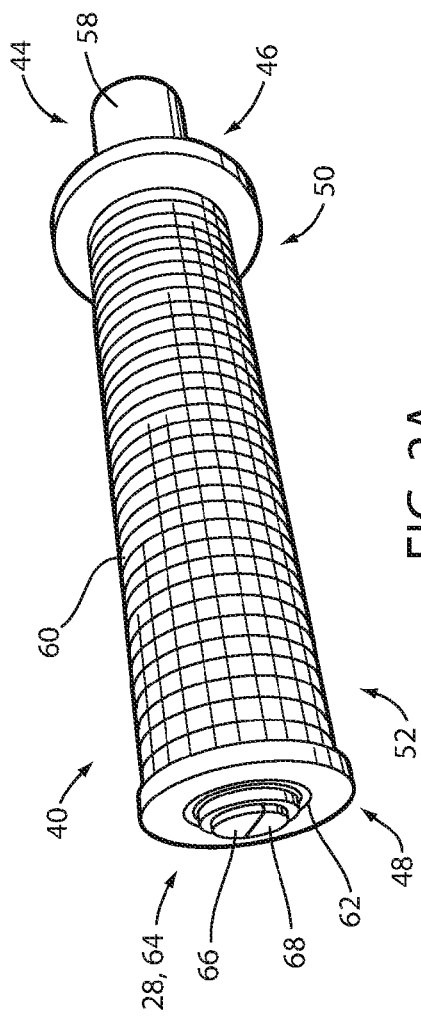
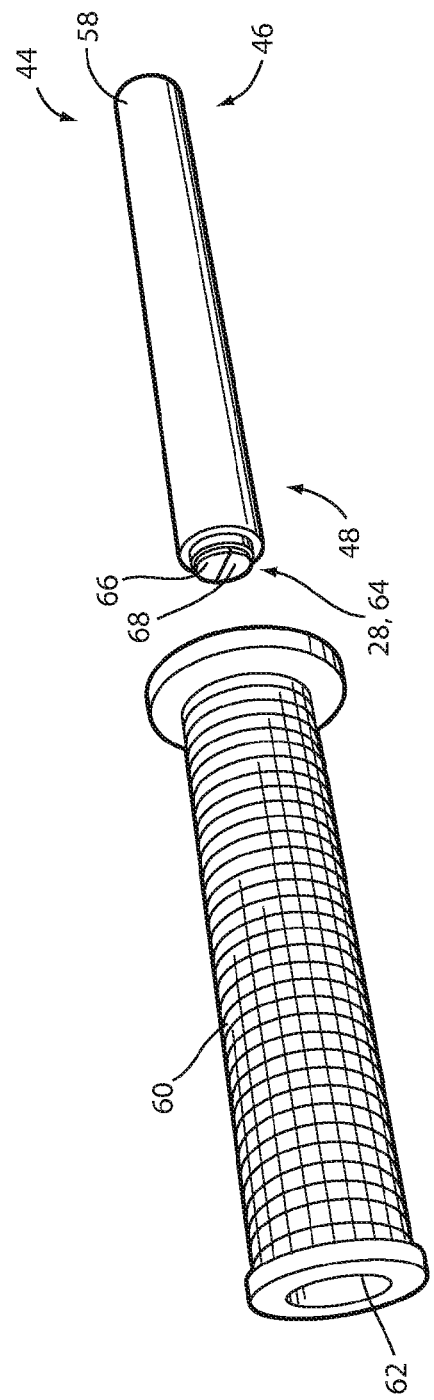
FIG. 2A
FIG. 2B

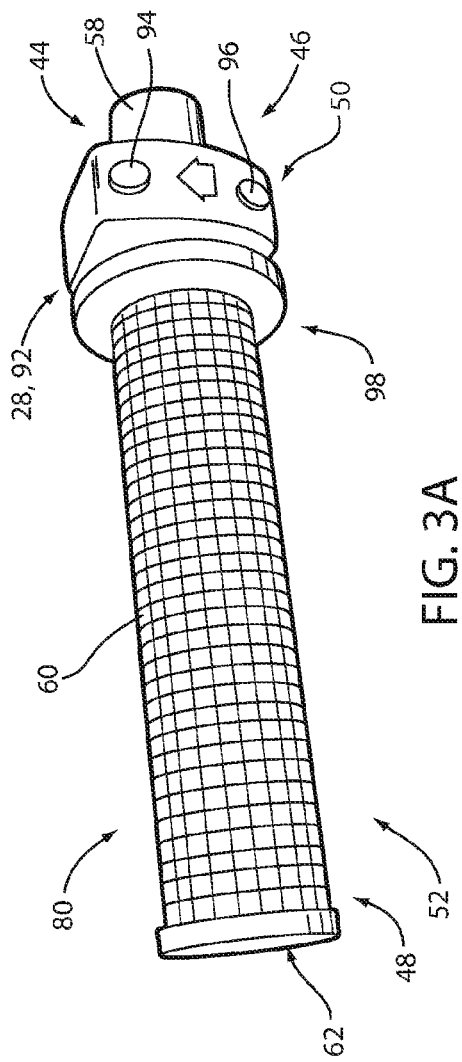
FIG. 3A
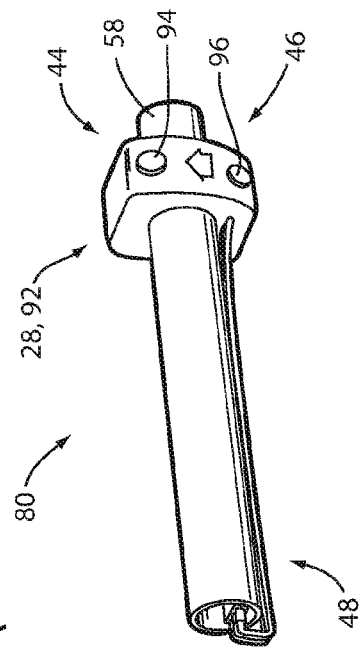
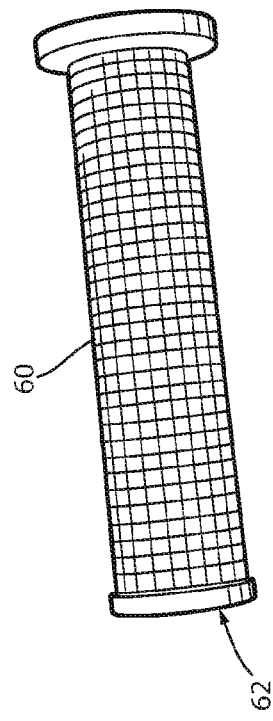
FIG. 3B

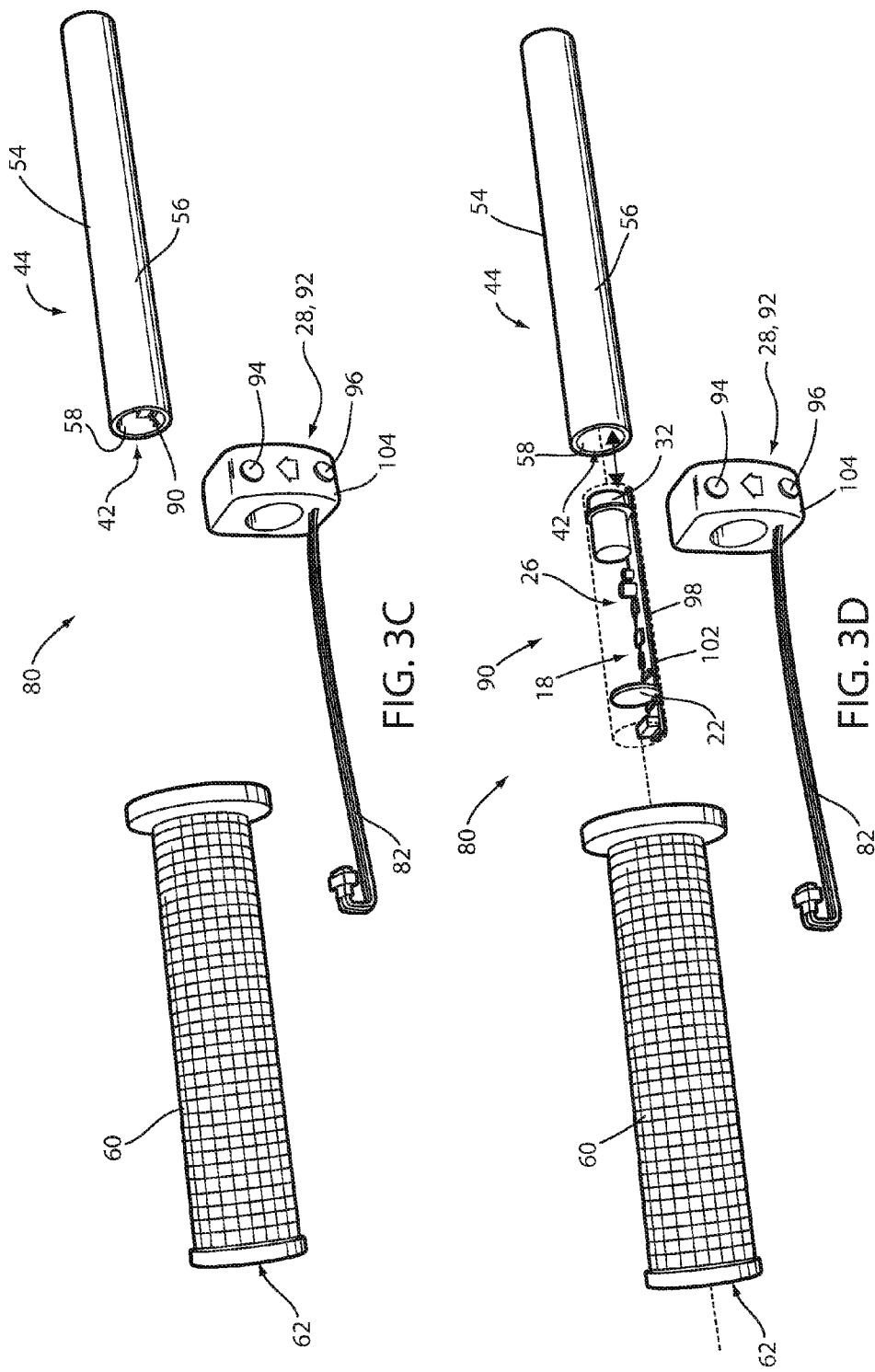

WIRELESS CONTROL SYSTEM FOR VEHICLE HANDLE

CROSS-REFERENCE TO RELATED APPLICATION

This application claims priority to and the benefit under 35 U.S.C. §119(e) of U.S. Provisional Patent Application No. 62/175,673, filed on Jun. 15, 2015, entitled "WIRELESS CONTROL SYSTEM FOR VEHICLE HANDLE," the entire disclosure of which is hereby incorporated herein by reference.

TECHNOLOGICAL FIELD

The present disclosure relates generally to a wireless control system configured to control at least one remotely controlled device and more particularly relates to a trainable wireless control system for use in a vehicle.

SUMMARY

One aspect of the present disclosure includes a wireless control system for controlling a remotely controlled device. The wireless control system comprises a circuit assembly. The circuit assembly comprises a transceiver circuit and an input device in communication with a control circuit. The control circuit is configured to control the transceiver circuit in response to an input received from the input device. The circuit assembly forms a profile shape configured to be significantly disposed within a handle portion of a vehicle.

Another aspect of the present disclosure includes a wireless control apparatus for controlling a remotely controlled device. The apparatus comprises a circuit assembly having a profile shape configured to be disposed in an internal passage of a handle of a vehicle. The circuit assembly comprises a transmitter circuit, a communication interface, and a control circuit. The control circuit is configured to control the transmitter circuit in response to an input received from an input device. The input device is exposed from the internal passage and in communication with the control circuit via the communication interface.

Yet another aspect of the present disclosure includes a wireless control apparatus configured to connect to a handle of a vehicle. The apparatus may further be configured to control a remotely controlled device via a circuit assembly. The circuit assembly has a profile shape configured to be disposed in an internal passage of the handle and comprises a transmitter circuit, a communication interface, and a control circuit. The control circuit is configured to control the transmitter circuit in response to an input received from an input device. The input device is exposed from the internal passage and in communication with the control circuit via the communication interface.

These and other features, advantages, and objects of the present device will be further understood and appreciated by those skilled in the art upon studying the following specification, claims, and appended drawings.

BRIEF DESCRIPTION OF THE DRAWINGS

FIG. 1 is a block diagram of a wireless control system operable to communication wirelessly with a remote electronic system;

FIG. 2A is an perspective view of a wireless control system disposed in a handle portion of a vehicle;

FIG. 2B is a partially exploded assembly view of a wireless control system disposed in a handle portion of a vehicle;

FIG. 3A is an perspective view of a wireless control system disposed in a handle portion of a vehicle;

FIG. 3B is a partially exploded assembly view of a wireless control system disposed in a handle portion of a vehicle;

FIG. 3C is a partially exploded assembly view of a wireless control system disposed in a handle portion of a vehicle; and FIG. 3D is a partially exploded assembly view of a wireless control system configured to be disposed in a handle portion of a vehicle in accordance with the disclosure.

DETAILED DESCRIPTION OF EMBODIMENTS

Figure 2C:
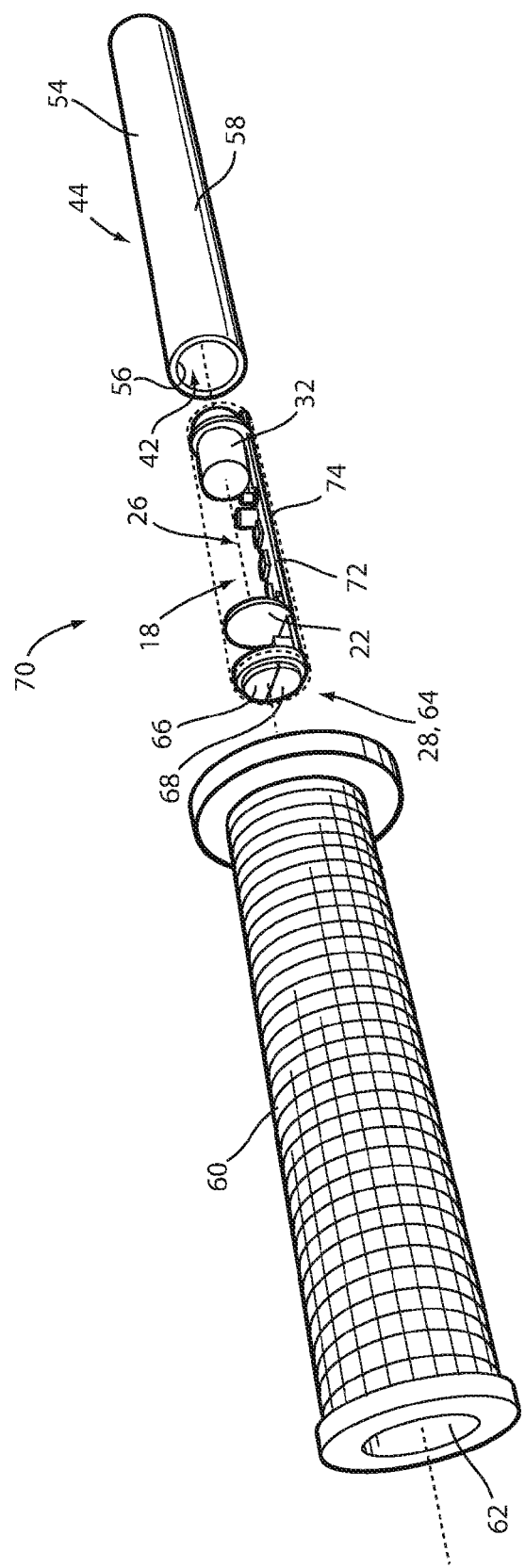
FIG. 2C is a partially exploded assembly view of a wireless control system configured to be disposed in a handle portion of a vehicle.

For purposes of description herein the terms "upper," "lower," "right," "left," "rear," "front," "vertical," "horizontal," and derivatives thereof shall relate to the device as oriented in FIG. 2. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The disclosure provides for various embodiments of a wireless control system configured to be at least partially disposed in a passageway formed by a component of a vehicle. The component may be disposed proximate a handle or grip portion that may be utilized during operation of the vehicle. The various embodiments of the wireless control system discussed herein may provide for remote operation of remotely controlled electronic system or remote electronic systems. The remote electronic systems may correspond to various systems configured to control electronic and/or electro-mechanical systems that may correspond to systems utilized in relation to homes, businesses, and various localities having remote electronic systems.

Referring now to FIG. 1, a block diagram 10 of a wireless control system 12 configured to communicate with a remote electronic system 14 is shown. The remote electronic system 14 may correspond to any of a plurality of remote electronic systems, such as, a garage door opener, a security gate control system, security lights, remote lighting fixtures or appliances, a home security system, etc. For example, the remote electronic system 14 may correspond to a garage door opener that may be utilized to access a residential or commercial garage. The wireless control system 12 is configured to wirelessly communicate with the remote electronic system 14 via a wireless communication interface 16.

The wireless communication interface 16 may be configured to transmit and/or receive signals communicated from the wireless control system 12 to the remote electronic system 14. In an exemplary implementation, the wireless control system 12 may comprise a remote transceiver circuit 18 configured to wirelessly communicate with a local transceiver circuit 20 of the remote electronic system 14 via wireless signals. The wireless signals may correspond to radio frequency RF signals, for example ultra-high frequency (UHF) band signals, and may also correspond to infrared signals, and/or various other wireless signals. The wireless signals of the remote transceiver circuit 18 may be emitted and received from a remote antenna 22 to communicate with a local antenna 24 of the local transceiver circuit 20.

Each of the transceiver circuits 18 and 22 may include transmit and/or receive circuitry configured to communicate signals from the remote antenna 22 to the local antenna 24 and vice versa. For example, the wireless signals may comprise control data configured to cause a garage door opener to open or close a garage door. Additionally, the wireless communication interface 16 may be operable to communicate status signals having status data indicating a status of remote electronic system 14. Such status signals may correspond to a variety of information, such as a success or failure indication of corresponding to control data sent from the transceiver circuit 18. Status signals may further correspond to an indication of whether a garage door is open or closed or moving between open and closed position, whether a security system is armed or disarmed, whether a light is on or off, etc.

The wireless control system 12 comprises a control circuit 26 configured to control various components and/or integrated circuits of the system 12, to store data in memory, operate preprogrammed functionality, send and receive wireless signals, etc. The control circuit 26 may include various types of control circuitry, digital and/or analog, and may include a microprocessor, microcontroller, application-specific integrated circuit (ASIC), or other circuitry configured to perform various input/output, control, analysis, and other functions to be described herein. The control circuit 26 may be coupled to an input device 28, which includes one or more switches (see FIGS. 2 and 3), but may alternatively include other user input devices, such as, switches, knobs, dials, a voice-actuated input control circuit configured to receive voice signals, etc.

The control circuit 26 may further be coupled to a status indicator 30. In various implementations, the status indicator 30 may correspond to one or more light-emitting diodes (LED), a display element, etc. The status indicator 30 may include other or additional display elements, such as a liquid crystal display (LCD). The status indicator 30 may include a single multi-colored LED (e.g., green, red, and yellow) or multiple LEDs, each of which may represent a different color. The status indicator 30 may be configured to display information corresponding to the status of remote electronic system 14 and/or the wireless control system 12. For example, the status indicator 30 may be controlled by the control circuit 26 to emit a first color of light to identify that a signal is sent to the remote electrical system 14 and a second color of t light configured to identify when a command requested by the wireless control system 12 is complete.

In operation, the wireless control system 12 is configured to receive one or more characteristics of an activation signal sent from an original transmitter. An original transmitter is a transmitter, typically a hand-held transmitter sold with the remote electronic system 14. The original transmitter is configured to transmit an activation signal at a predetermined carrier frequency having control data configured to actuate the remote electronic system 14. For example, the original transmitter can be a hand-held garage door opener transmitter configured to transmit a garage door opener signal at a frequency, such as 355 megaHertz (MHz), wherein the activation signal has control data, which can be a fixed code or a cryptographically-encoded code. The remote electronic system 14 is configured to open a garage door, for example, in response to receiving the activation signal from the original transmitter.

The transceiver 18 is configured to receive one or more characteristics of the activation signal from the original transmitter or from another source. The one or more characteristics may include the frequency, control data, modulation scheme, etc. In this configuration, the transceiver 18 is configured to learn at least one characteristic of the activation signal by receiving the activation signal, determining the frequency of the activation signal, and demodulating the control data from the activation signal. The wireless control system 12 may correspond to a Homelink® trainable transceiver and may be constructed according to one or more embodiments disclosed in U.S. Pat. Nos. 6,091,343, 5,854,593 or 5,708,415, which are herein incorporated by reference in their entirety.

In some embodiments, the wireless control system 12 may be configured to receive one or more characteristics of the activation signal by other methods. For example, the one or more characteristics of the activation signal may be preprogrammed into a memory of the control system 12 during manufacture or may be input via the input device 28. Accordingly, the wireless control system 12 may be programmed by alternate or optional methods that may not require receiving the activation signal from an original transmitter in order to identify characteristics of the activation signal. The wireless control system 12 may receive or identify the characteristics of the activation signal by various methods and store the characteristics of the activation signal in memory.

The transceiver circuit 18 may be configured, via the control circuit 26, to generate a carrier frequency at any of a number of frequencies, some of which may correspond to the ultra-high frequency range. The carrier frequency may be approximately between 20 and 470 megaHertz (MHz), and in some implementations may be between 280 and 430 MHz. The control data may be modulated on to the carrier frequency signal via frequency shift key (FSK) or amplitude shift key (ASK) modulation and may utilize additional modulation techniques. The control data on the wireless control signal may be a fixed code, a rolling code, or various cryptographically encoded control codes suitable for use with remote electronic systems.

In some embodiments, the control system 12 may correspond to a stand-alone system configured to operate via a power supply 32, which may be in the form of a battery. In some embodiments, the control system 12 may also or alternatively be in communication with one or more additional systems of the vehicle, for example a control module and/or a power supply of the vehicle. In such implementations, the control system 12 may further be operable to activate the transceiver circuit 18 to output control signals configured to control the remote electrical system 14 in response to receiving one or more signals from the control module of the vehicle. The one or more signals may correspond to various operating states of the vehicle, for example a drive state of forward, reverse, or neutral/park; a location of the vehicle identified by a GPS module or alternative positioning module in communication with the control module; an operator identity communicated by the control module, etc. In this way, the input device 28 may be operable to activate different control signals to control various remote electrical systems and/or functions thereof based on the signals received form the control module of the vehicle and any other systems or peripherals in communication with the control module or the control system 12.

FIGS. 2A, 2B, and 2C demonstrate assembly views of a handle mounted wireless control system 40 in accordance with the disclosure. The wireless control system 40 may correspond to the wireless control system 12 having corresponding elements like numbered for clarity. The control system 40 is at least partially disposed in an internal passage 42 formed by a handle portion 44 or handle bar of a vehicle. The vehicle may correspond to various forms of vehicles that may have handle portions, for example, bicycles, motorcycles, all-terrain vehicles (ATVs), jet skis, and various other vehicles that may be maneuvered at least in part by utilizing a handle portion.

The handle portion 44 may comprise a proximal portion 46 and a distal end portion 48, which may correspond to an inboard portion 50 and an outboard portion 52 of the handle portion 44, respectively. The handle portion 44 may comprise a tubular body 54 having an inner diameter 56 configured to receive at least a portion of the control system 40 and an outer diameter 58 configured to receive a grip 60 of the vehicle. The handle portion 44 may be of various materials and may be configured to have sufficient strength to support forces required to maneuver a particular vehicle. Some materials for the handle portion 44 may be of metallic, polymeric, composite materials, etc. suited to particular applications.

The grip 60 may be configured to provide a comfortable gripping surface to be grasped by an operator to maneuver the vehicle. The grip 60 may be of various materials corresponding to various applications. In some implementations, the grip 60 may be of polymeric materials configured to provide a comfortable gripping surface configured to receive forces to maneuver a vehicle. The grip 60 may form an engaging surface 62 configured to engage the outer diameter 58 of the grip 60. Though the handle portion 44 and the grip 60 are described as having substantially rounded or circular cross-sections, it shall be understood that the handle portion 44, the internal passage 42, and the engaging surface 62 may conform to various shapes and proportions without departing from the spirit of the disclosure.

In some embodiments, a user interface 64 corresponding to the input device 28 of the control system 12 may be disposed proximate the distal end portion 48 of the handle portion 44 and the internal passage 42. The user interface 64 may comprise a first user input 66 and a second user input 68. In an assembled form, as shown in FIG. 2A, the user interface 64 is affixed proximate the distal end portion 48 of the handle portion 44 such that the first user input 66 and the second user input 68 are accessible by an operator of the vehicle. In this configuration, the operator may depress the first user input 66 and/or the second user input 68 to cause the control system 40 to activate and/or program a control signal configured to control the remote electrical system 14. The first user input 66 and the second user input may correspond to various electrical and/or electro-mechanical switches and may correspond to momentary switches.

Referring now to FIG. 2C, a circuit assembly 70 of the control system 40 is shown in an exploded assembly view along an axis of the handle portion 44 extending into the internal passage 42. The circuit assembly 70 comprises a printed circuit board 72 configured to enable electrical communication from the control circuit 26 to and/or from the power supply 32, the input device 28, the transceiver circuit 18, and in some implementations the control module/vehicle power supply. The circuit assembly 70 is configured to form an interface shape 74 configured to be at least partially disposed within the internal passage 42. As best demonstrated in FIG. 2B, the circuit assembly 70 is substantially disposed within the internal passage 42 having only the first user input 66 and the second user input 68 of the control system 40 extending proximate to or somewhat beyond the distal end portion 48 of the handle portion 44. In this configuration, the first user input 66 and the second user input 68 of the input device 28 may form a cap portion configured to significantly seal and enclose the internal passage 42. The circuit assembly 70 is configured to be implemented in various handle portions of vehicles with little adjustment to existing handle and grip assemblies.

FIGS. 3A, 3B, 3C, and 3D demonstrate assembly views of a handle mounted wireless control system 80 in accordance with the disclosure. The wireless control system 80 may correspond to the wireless control system 12 having corresponding elements like numbered for clarity. The control system 80 is at least partially disposed in the internal passage 42 formed by the handle portion 44 or handle bar of a vehicle. The handle portion 44 comprises the proximal portion 46 and the distal end portion 48 corresponding to an inboard portion 50 and an outboard portion 52 of the handle portion 44, respectively. The handle portion 44 may comprise a tubular body 54 having an inner diameter 56 configured to receive at least a portion of the control system 40 and an outer diameter 58 configured to receive a grip 60 of the vehicle.

The grip 60 may be configured to provide a comfortable gripping surface to be grasped by an operator to maneuver the vehicle. The grip 60 may form an engaging surface 62 configured to engage the outer diameter 58 of the grip 60 and may further be configured to at least partially conceal a communication interface 82 extending from a circuit assembly 90 of the control system 80 to an input assembly 92. The communication interface 82 may correspond to one or more insulated electrical wires configured to transmit signals from the input device 28 disposed in the input assembly 92 to the control circuit 26 disposed in the circuit assembly 90. In this configuration, a first user input 94 and a second user input 96 may be disposed proximate an inner most portion of the grip 60 corresponding to an inboard extent 98 of the grip 60 proximate the proximal portion 46 of the handle portion 44. The input assembly 92 may correspond to a housing configured to secure the first user input 94 and the second user input 96 to the handle portion 44. Though the handle portion 44 and the grip 60 are described as having substantially rounded or circular cross-sections, it shall be understood that the handle portion 44, the internal passage 42, and the engaging surface 62 may conform to various shapes and proportions without departing from the spirit of the disclosure.

The wireless control system 80 may provide for an operator of the vehicle to control the wireless control system 80 by utilizing a thumb or digit while grasping the grip 60 to maneuver the vehicle. In this configuration, the operator may depress the first user input 94 and/or the second user input 96 to control the control system 40 to activate and/program a control signal configured to control the remote electrical system 14. In this way, the operator may control the remote electrical system 14 comfortably while maintaining contact with the grip 60 to maneuver the vehicle. The first user input 66 and the second user input 68 may correspond to various electrical and/or electro-mechanical switches and may correspond to momentary switches.

Similar to the circuit assembly 70, the circuit assembly 90 may comprise a printed circuit board 98 configured to enable electrical communication from the control circuit 26 to and/or from the power supply 32, the input device 28, the transceiver circuit 18, and in some implementations the control module/vehicle power supply. The printed circuit board 98 may further comprise at least one input/output (I/O) port in communication with the control circuit 26 configured to connect to the communication interface 82. The circuit assembly 90 may further be configured to form an interface shape 102 configured to be at least partially disposed within the internal passage 42.

As best demonstrated in FIGS. 3B and 3C, the circuit assembly 90 is substantially disposed within the internal passage 42. In some implementations, the circuit assembly 90 is completely disposed in the internal passage 42 having only the input assembly 92 in communication with the control system 40 via the communication interface 82 included outside the internal passage 42. In some embodiments, the input assembly 92 may further comprise the status indicator 30 incorporated in a housing 104 of the input assembly 92. In such implementations, the status indicator 30 may further be in communication with the control circuit 26 via the communication interface 82 to communicate information corresponding to the status of the remote electronic system 14 and/or the wireless control system 12. In this way, the control circuit 26 may selectively activate the status indicator 30 to communicate the status to the operator of the vehicle.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read-only memory (ROM), erasable programmable read only memory (EPROM) or other machine-readable medium such as a magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures that may be separately stored and managed, may be incorporated into a single memory or database, may be logically and physically organized in many different ways, and also may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A wireless control system for controlling a remotely controlled device, the wireless control system comprising:
   a circuit assembly comprising:
      a transceiver circuit;
      an input device; and
      a control circuit configured to control the transceiver circuit in response to an input received from the input device; and
   wherein the circuit assembly forms a profile shape configured to be disposed in an internal passage formed within an end portion of a handle portion of a vehicle.

2. The wireless control system according to claim 1, wherein the transceiver circuit and the control circuit are completely disposed within an internal passage formed by the handle portion.

3. The wireless control system according to claim 1, where the input device is in attachment with the handle portion at least partially outside the internal passage.

4. The wireless control system according to claim 1, wherein the control circuit is configured to control the transceiver to emit a control signal configured to control the remotely controlled device.

5. The wireless control system according to claim 1, wherein the control circuit is further configured to:
   receive a control signal from a remote control device and identify an encoded control code of the control signal.

6. The wireless control system according to claim 5, wherein the control circuit is configured to control the transceiver to emit the encoded control signal to control the remotely controlled device.

7. A wireless control apparatus for controlling a remotely controlled device comprising:
   a circuit assembly having a profile shape configured to be disposed in an internal passage of a handle of a vehicle, the circuit assembly comprising:
      a transmitter circuit;
      a communication interface; and
      a control circuit configured to control the transmitter circuit in response to an input received from an input device; and
   the input device exposed from the internal passage and in communication with the control circuit via the communication interface, wherein the profile shape of the circuit assembly is configured to be disposed in the internal passage via an opening of the handle proximate the outboard portion.

8. The wireless control apparatus according to claim 7, wherein the input device comprises at least one input interface configured to receive a user input.

9. The wireless control apparatus according to claim 7, wherein the input device is configured to connect to an outer diameter of the handle.

10. The wireless control apparatus according to claim 7, wherein the handle comprises a grip for operating the vehicle comprising an inboard portion and an outboard portion.

11. The wireless control apparatus according to claim 10, wherein the input device is configured to connect to the inboard portion of the handle.

12. The wireless control apparatus according to claim 11, wherein the handle comprises a grip disposed on the handle extending substantially from the outboard portion to the inboard portion.

13. The wireless control apparatus according to claim 12, wherein the grip is configured to conceal the communication interface.

14. A wireless control apparatus configured to connect to a handle of a vehicle and for controlling a remotely controlled device, the apparatus comprising:
  a circuit assembly having a profile shape configured to be disposed in an internal passage of the handle, the circuit assembly comprising:
    a transmitter circuit;
    a communication interface; and
    a control circuit configured to control the transmitter circuit in response to an input received from an input device; and
  the input device exposed from the internal passage and in communication with the control circuit via the communication interface;
  wherein the handle comprises sa proximal portion and a distal portion, and the profile shape of the circuit assembly is configured to be disposed in the internal passage via an opening formed by the handle proximate the distal portion.

15. The wireless control apparatus according to claim 14, wherein the input device forms a cap portion in connection with the opening.

16. The wireless control apparatus according to claim 15, wherein the cap portion is configured to engage the opening and seal the internal passage from an outside environment.

17. The wireless control apparatus according to claim 14, wherein the input device comprises a first user input and a second user input configured to cause the control circuit to activate a control signal configured to control the remotely controlled device.

* * * * *